START-STOP PULSE GENERATORS

Filed Dec. 17, 1964 2 Sheets-Sheet 1

INVENTORS=
FREDERICK L. MALTBY,
HARRY REIFEL,
BY Robert T. Palmer
ATTORNEY

INVENTORS=
FREDERICK L. MALTBY,
HARRY REIFEL,
BY Robert T. Palmer
ATTORNEY

United States Patent Office
3,351,933
Patented Nov. 7, 1967

3,351,933
START-STOP PULSE GENERATORS
Frederick L. Maltby, Abington, Pa., and Harry Reifel, Waltham, Mass., assignors to Stevens-Arnold Inc., a corporation of Massachusetts
Filed Dec. 17, 1964, Ser. No. 419,087
17 Claims. (Cl. 340—359)

This invention relates to start-stop pulse generators such as are used in data transmission systems, and has an object to improve the stabilities of such pulse generators.

In start-stop operation of data transmission systems, the signals generated for each line of bits of information begin with a start signal which starts a local pulse generator at a receiver. Following each start signal is a train of signals which convey the intelligence. The local pulse generator generates voltage that is used to form so-called clock pulses which are synchronized with the information conveying signals. The signals generated for each line of bits of information can end with a stop signal which stops the local pulse generator, or a counter can be used at the receiver to count the start and intelligence conveying signals or the clock pulses, and to cause a stop signal to be generated after a predetermined number of counts. Teletype systems of this nature are disclosed in the U.S. Patents Nos. 2,914,612 and 3,022,375. A perforated tape system of this nature is disclosed in the U.S. Patent No. 3,134,035. A phase-modulated system of this type is disclosed in Chapter 16 of the textbook "Pulse and Digital Circuits" published in 1956 by McGraw-Hill Book Company.

For accurate operation of such a system, it is essential that the pulses generated by the pulse generator at a receiver be in phase with corresponding intelligence conveying signals. Prior pulse generators have been electronic oscillators requiring RC or LC networks, the characteristics of the components of which change with use and age, and which cause the frequency of an oscillator to change. Also, as is described on page 504 of the said textbook, when such an oscillator is gated on, there is a switching transient which distorts the first few cycles of the oscillator waveform.

This invention is an electromagnetic pulse generator which is more stable and trouble free than prior electronic oscillators. In one embodiment of this invention, a cantilever supported reed of magnetic spring metal has its free end opposite the ends of polepieces of a coil of an electromagnet. When a stop signal is received, the coil is energized, and the free end of the reed is attracted to and clamped against the ends of its polepieces. When a start signal is received, the coil is deenergized so that its polepieces release the free end of the reed. The reed then vibrates at its resonant frequency which is the frequency of the signals to be synchronized, and voltage is generated by the vibration of the reed. This voltage is used to generate clock pulses in the usual manner.

This invention will now be described with reference to the annexed drawings, of which:

Figure 1:
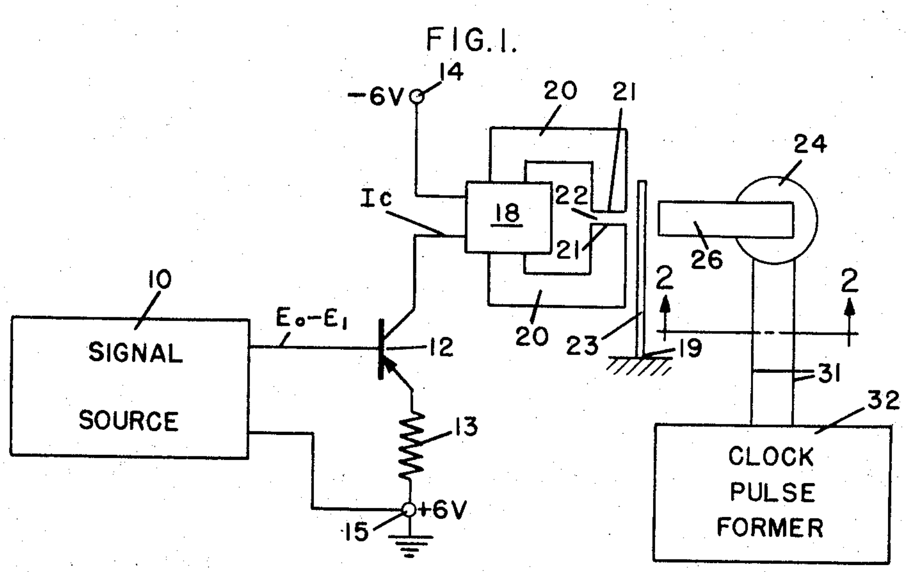
FIG. 1 is a circuit schematic of a data receiving system embodying this invention.

Referring first to FIG. 1 of the drawings, the reference character 10 is applied to a conventional source of start, intelligence conveying and stop signals, which may be a teletype receiver, a telephone or Dataphone receiver adapted to receive signals corresponding to information stored in punched or otherwise coded tapes, or any other receiver adapted to receive and pass on, start, intelligence conveying and stop signals. The source 10 receives, for example, start signals, each followed by a train of eight intelligence conveying signals, and each train of intelligence conveying signals being followed by a stop signal. The source 10 is connected to base of p-n-p transistor 12 and to grounded, + terminal 15 of a conventional six volt DC source which is not shown. The emitter of the transistor 12 is connected through resistor 13 to the terminal 15. The collector of the transistor 12 is connected through coil 18 to the negative terminal 14 of the DC source.

The coil 18 has polepieces 20 which are generally rectangular in outline except that they have slightly spaced apart ends 21 with a small gap 22 therebetween. A reed 23 of magnetic spring metal has one end cantilever supported at 19, and has one side of its free end opposite the gap 22, and normally spaced from the polepiece ends 21. A voltage generator coil 24, also shown by FIG. 2, has polepieces 26 which are generally rectangular in outline except that they have slightly spaced apart ends 27 with a small gap 28 therebetween. The gap 28 is opposite the other side of the free end of the reed 23, and the polepiece ends 27 are normally spaced from the said other side of the free end of the reed 23. The polepieces 26 are in series in a magnetic circuit with a permanent magnet 30 around which the coil 24 extends. The axes of the coils 18 and 24 extend normal to each other so that there can be no magnetic coupling between the two coils. The coil 24 is connected by wires 31 to the input of a conventional clock pulse former 32 such as is disclosed in the previously mentioned Patent No. 2,914,612.

In the operation of FIG. 1, the source 10, when it delivers a stop signal $E_0$, current having a negative polarity is applied to the base of the transistor 12 causing the latter to conduct and to supply through its collector, current $I_c$ to the reed clamp coil 18. The latter is energized and the free end of the reed 23 is attracted to and clamped against the ends 21 of the polepieces 20. When the source 10 delivers a start signal $E_1$, the current is supplied to the base of the transistor 12 is discontinued; the transistor 12 is cut off; the coil 18 is deenergized, and the free end of the reed 23 is released. The reed 23 then vibrates at its resonant frequency which, for example, may be 150 c.p.s. The reed in vibrating, moves its free end towards and from the polepiece ends 27, and varies the magnetic field of the coil 24, causing voltage to be generated in the latter.

While the reed 23 is vibrating, the voltage it generates in the coil 24 is applied to the input of the clock pulse former 32 which forms the usual clock pulses. The voltage generated in the coil 24 by the vibration of the reed 23, decreases in amplitude about 10% at the end of ten vibrations of the reed, but this decrease is of no consequence since the clock pulse former is triggered each time the waveform of the voltage from the coil 24 crosses its zero axis in a positive going direction.

Figure 2:
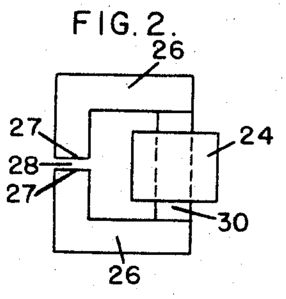
FIG. 2 is a view of the voltage generator coil of the pulse generator, and its magnetic circuit, taken along the lines 2—2 of FIG. 1.
Figure 3:
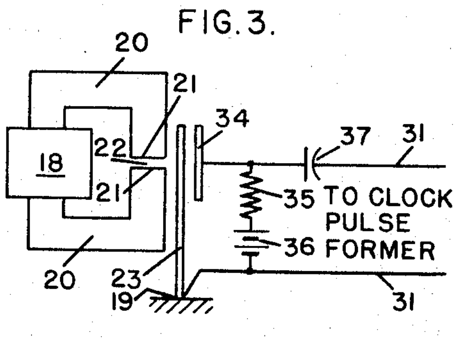
FIG. 3 is a diagrammatic side view of another pulse generator embodying this invention.
Figure 4:
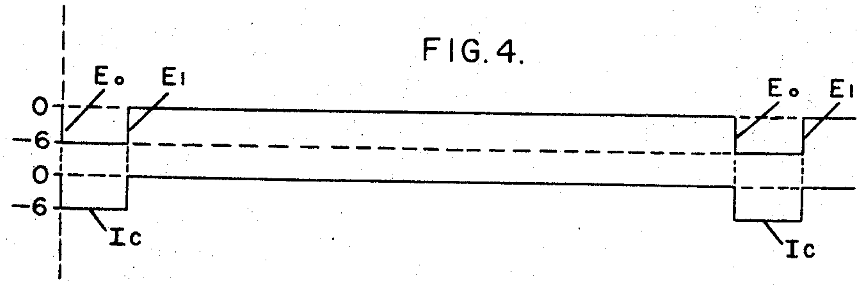
FIG. 4 shows voltage and current waveforms in the circuit of FIG. 1.

The pulse generator of FIG. 3, instead of using a coil in a magnetic circuit to generate voltage when the reed is vibrating, uses a capacitor electrode 34 where the pole-pice ends 27 of FIGS. 1 and 2 are, the reed clamping portion of FIG. 3 being the same as that of FIG. 1. The electrode 34 is connected in series with resistor 35 and battery 36 to the reed 23, and through coupling capacitor 37 to one of the wires 31 leading to the clock pulse former, the other wire 31 being connected to the reed. In the operation of FIG. 3, vibration of the reed 23 causes changes in capacity between its free end and the electrode 34, producing AC voltage which is supplied to the clock pulse former to trigger the latter.

Figure 5:
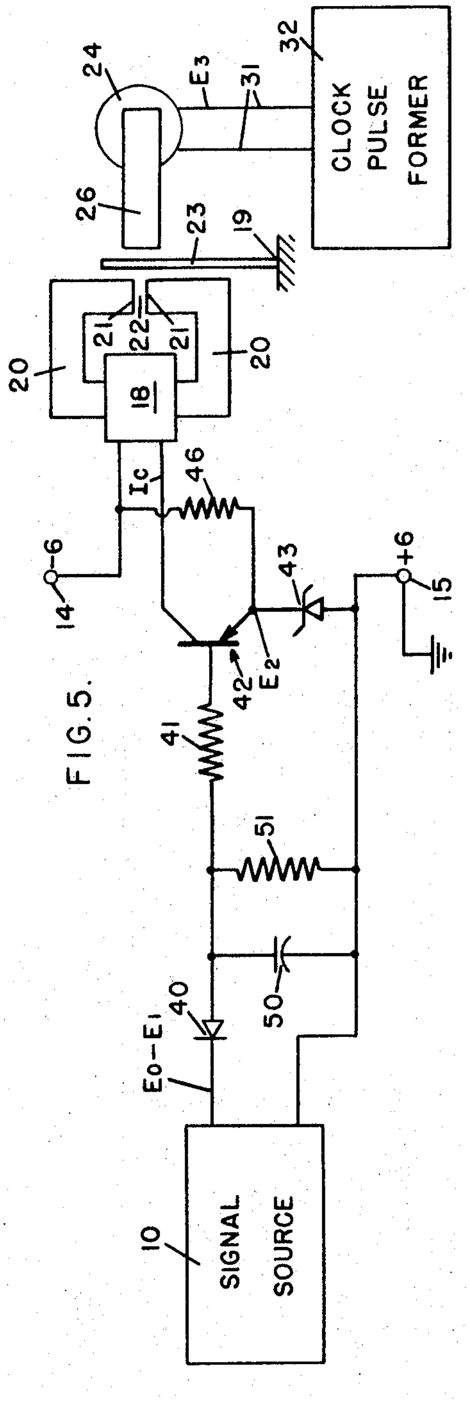
FIG. 5 is a circuit schematic of a modification of the embodiment of FIG. 1.
Figure 6:
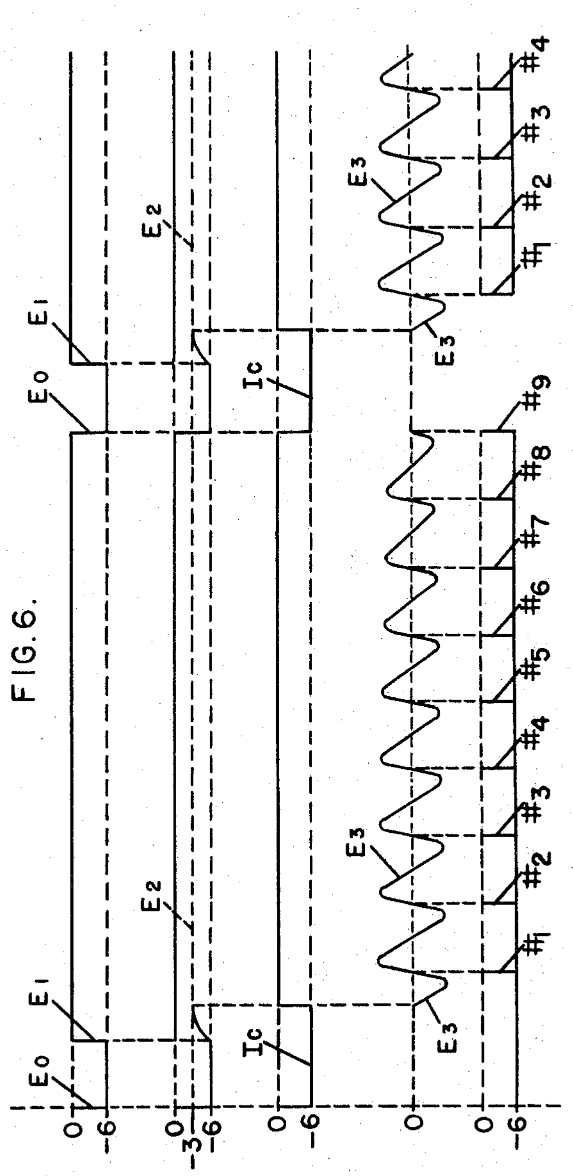
FIG. 6 shows voltage and current waveforms in the circuit of FIG. 5.

The characteristics of the pulse generator are such that the generated voltage is not a pure sinewave, but as shown at $E_3$ of FIG. 6, has at the ends of the first, third and following odd numbered halfwaves, steeper sides than at the ends of the second, fourth and following even numbered halfwaves. It is preferred to trigger the clock pulse former when the steeper sides of the waveform of the generated voltage cross it zero axis. This requires, however, that the first trigger occur a halfwave after a start signal instead of the required fullwave. It is necessary, therefore, to delay the production of the first synchronizing clock pulse by making each stop signal a halfwave length longer. This is accomplished in the circuit of FIG. 5, the waveforms at different points of which are shown by FIG. 6.

Referring now to FIG. 5, the output of the source 10 is connected through diode 40 and resistor 41 to the base of p-n-p transistor 42, the emitter of which is connected through Zener diode 43 to +6 volt terminal 15 and to ground. The emitter is also connected through resistor 46 to −6 volt terminal 14. The collector of the transistor 42 is connected through clamp coil 18 of the pulse generator to the terminal 14. A capacitor 50 and a resistor 51 are connected in parallel between the junction of the resistor 41 and the diode 40, and to ground.

In the operation of FIG. 5, when a stop signal $E_0$ is supplied from the source 10, −6 volts is applied to the base of the transistor 42 causing the latter to conduct and supply current $I_c$ to the clamp coil 18, energizing the latter, and causing the reed 23 to be clamped against the polepiece ends 21. The capacitor 50 is charged at the same time. The stop signal $E_0$ is supplied for the usual one wavelength. The following start signal $E_1$ is zero volts but the transistor 42 is not cut off since the capacitor 50 connected to its base is charged. The capacitor 50 discharges exponentially through the resistor 51 and such other circuit impedances that are connected across it, to a −3 volt level $E_2$, maintained by the Zener diode 43, at about a halfwave length after the start signal $E_1$ occurs, and at that level the transistor 42 is cut off; the coil 18 is deenergized, and the reed 23 is released at about a halfwave length after the occurrence of the start signal.

AC voltage $E_3$, starting, for example, at the first negative halfwave, is supplied as a result of the vibration of the reed after it is released, to the clock pulse former 32. The first crossing of the zero axis at the end of the first negative halfwave, triggers the clock pulse former to cause it to deliver the first synchronizing clock pulse #1 (bottom line of FIG. 6), and the following crossings of the zero axis trigger and the clock pulse former to cause it to deliver the clock pulses #2–#9, of which the pulses #2–#8 are synchronizing pulses, and #9 may be used for another purpose such as checking or testing.

While the first halfwave of the voltage generated by the pulse generator is described as being negative, it could be positive since that would involve no more than reversing the wires 31, and it is conventional to trigger clock pulse formers with voltages crossing zero axes in both positive and negative going directions.

The stop pulses instead of being received from a transmitter could be generated at a receiver using a counter to count intelligence conveying or clock pulses, and to operate a flip-flop multivibrator to supply a stop signal after a predetermined number of counted pulses as disclosed in the previously mentioned Patent No. 2,914,612.

What is claimed is:

1. A start-stop pulse generator comprising a non-driven vibratible reed, a reed clamping coil, said coil having a polepiece with an end adjacent to and normally spaced from said reed, said reed having a portion of magnetic material opposite said polepiece end, means for flowing DC through said coil for energizing said coil to cause said reed to be clamped against said polepiece end, and for then discontinuing the flow of said DC for a period of time sufficient for said reed to vibrate a predetermined number of times at its resonant frequency after it is released from said polepiece end, and means responsive to the vibration of said reed for generating an AC voltage.

2. A generator as claimed in claim 1 in which said reed is of spring metal, is cantilever supported at one end, and its free end is opposite said polepiece end.

3. A generator as claimed in claim 2 in which said generating means comprises a generator coil having a magnetic circuit including a permanent magnet and a polepiece with an end at the opposite side of the reed from said polepiece end of said clamping coil.

4. A generator as claimed in claim 3 in which the axes of said coils are normal to each other.

5. A generator as claimed in claim 1 in which said generating means comprises a capacitor electrode at the opposite side of said reed from said polepiece end.

6. A generator as claimed in claim 5 in which said reed is of spring metal, is cantilever supported at one end, and its free end is between said electrode and said polepiece end.

7. A start-stop pulse generator as claimed in claim 1 in which said reed is of spring metal, is cantilever supported at one end with its free end opposite said polepiece end, and in which said generating means comprises a generator coil having a magnetic circuit including a permanent magnet and a polepiece with an end at the opposite side of said free end from said polepiece end of said clamping coil, said coils having axes which extend normal to each other.

8. In a data transmission system having means for supplying stop signals for equally spaced-apart, equal periods of time, and for supplying start signals between said stop signals, and having a clock pulse former, a start-stop pulse generator comprising a non-driven vibratible reed having a portion of magnetic material, a reed clamping coil having a polepiece with an end adjacent to and normally spaced from said reed opposite said portion, means connected to said first mentioned means and to said coil for energizing said coil to cause said reed to be clamped against said polepiece during said stop signals and for deenergizing said coil for releasing said reed during said start signals, means responsive to the vibration of said reed at its resonant frequency when said reed is released for generating an AC voltage, and means connecting said last mentioned means to the input of said clock pulse former.

9. The invention claimed in claim 8 in which said means for deenergizing said coil includes time delay means for delaying the deenergization of said coil for a predetermined period of time after the occurrence of a start signal.

10. The invention claimed in claim 9 in which said reed is of spring metal, is cantilever supported at one end, and its free end is opposite said polepiece end.

11. The invention claimed in claim 10 in which said generating means comprises a generator coil having a magnetic circuit including a permanent magnet and a polepiece with an end at the opposite side of said free end from said polepiece end of said clamping coil, said coils having axes which extend normal to each other.

12. The invention claimed in claim 8 in which said reed is of spring metal, is cantilever supported at one end, and its free end is opposite said polepiece end.

13. The invention claimed in claim 12 in which said generating means comprises a generator coil having a magnetic circuit including a permanent magnet and a polepiece with an end at the opposite side of said free end from said polepiece end of said clamping coils, said coils having axes which extend normal to each other.

14. The invention claimed in claim 13 in which said means for deenergizing said clamping coil includes time delay means for delaying the deenergization of said clamping coil for approximately the period of time required for the generation of a halfwave of said voltage after the occurrence of a start signal.

15. The invention claimed in claim 8 in which said means for deenergizing said claimping coil includes time delay means for delaying the deenergization of said clamping coil for approximately the period of time required for the generation of a halfwave of said voltage after the occurrence of a start signal.

16. The invention claimed in claim 15 in which said reed is of spring metal, is cantilever supported at one end, and its free end is opposite said polepiece end.

17. The invention claimed in claim 16 in which said generating means comprises a generator coil having a magnetic circuit including a permanent magnet and a polepiece with an end at the opposite side of said free end from said polepiece end of said clamping coil, said coils having axes which extend normal to each other.

References Cited

UNITED STATES PATENTS

| | | | |
|---|---|---|---|
| 1,724,900 | 8/1929 | Beach | 340—345 |
| 1,821,181 | 9/1931 | Gunn | 310—25 XR |
| 2,349,125 | 5/1944 | Turner | 331—156 XR |
| 2,558,991 | 7/1951 | Stanton | 310—25 |
| 2,793,293 | 5/1957 | Ehrlinger et al. | 310—25 |
| 3,015,769 | 1/1962 | Natonek | 318—128 |
| 3,020,455 | 2/1962 | Reifel | 310—25 XR |
| 3,265,992 | 8/1966 | Pleasure | 178—47 XR |

MILTON O. HIRSHFIELD, *Primary Examiner.*

D. F. DUGGAN, *Assistant Examiner.*